United States Patent [19]

Ziegler

[11] Patent Number: 4,462,058
[45] Date of Patent: Jul. 24, 1984

[54] SWITCHING APPARATUS FOR DEVICES FOR ALTERNATING CURRENT PARALLEL REMOTE FEED

[75] Inventor: Alfred Ziegler, Munich, Fed. Rep. of Germany

[73] Assignee: Siemens Aktiengesellschaft, Berlin & Munich, Fed. Rep. of Germany

[21] Appl. No.: 421,287

[22] Filed: Sep. 22, 1982

[30] Foreign Application Priority Data

Nov. 16, 1981 [DE] Fed. Rep. of Germany ....... 3145437

[51] Int. Cl.³ .................. H02H 3/00; H02H 7/00; H02J 3/00; H02J 7/00
[52] U.S. Cl. ......................... 361/62; 361/65; 307/64; 307/86; 179/170 J
[58] Field of Search ............... 361/62, 63, 65, 79; 307/64, 65, 66, 86; 179/70, 77, 170 J

[56] References Cited

U.S. PATENT DOCUMENTS 3,835,334 9/1974 Notteau ........................... 179/170 J
4,362,952 12/1982 Ziegler .................................. 307/64

FOREIGN PATENT DOCUMENTS 1116739 11/1961 Fed. Rep. of Germany ... 179/170 J

OTHER PUBLICATIONS

Siemens-Zeitschrift 45, 1971, Supplement Nachrichten-Ubertragungstechnik, p. 102.

Primary Examiner—E. A. Goldberg
Assistant Examiner—Patrick W. Foster
Attorney, Agent, or Firm—Hill, Van Santen, Steadman & Simpson

[57] ABSTRACT

A switching device is provided for alternating current parallel remote feed for the automatic disconnection of a faulty section and connection of a fault-free section of a remote feed field. The switching apparatus enables safe continued operation in case of a field fault. To this end, the switching apparatus contains switches for disconnecting the remote feed current paths and for connecting a d.c. voltage source to the section of the remote field facing away from the alternating voltage source. The switches are controllable by the direct current emitted by the d.c. voltage source and by the alternating currents flowing in the remote feed current paths.

10 Claims, 3 Drawing Figures

SWITCHING APPARATUS FOR DEVICES FOR ALTERNATING CURRENT PARALLEL REMOTE FEED

BACKGROUND OF THE INVENTION

1. Field of the Invention

The present invention relates to switching apparatus more particularly switching apparatus for the automatic disconnection of a faulty section and connection of a fault-free section of a remote feed field for devices for alternating current parallel remote feed which are fed from an alternating current source, particularly communication transmission circuits having remotely-fed intermediate stations.

2. Description of the Prior Art

A precaution is to be undertaken with communication transmission circuits having remotely-fed intermediate repeaters or regenerators, referred to below as intermediate stations, so that, given damage to the cable resulting in a short circuit or an interruption in the remote feed circuit, there is no danger to personnel at the location of the fault. It is also advantageous in such a case that the transmission system continues to remain in operation on the line portion from the feed location up to the intermediate station located directly in front of the fault location. The faulty cable field can then be identified through the inherent system locating procedure.

To this end, it is already known (Siemens-Zeitschrift 45 (1971), supplement "Nachrichtenubertragungestechnik", Page 102), given transmission systems whose intermediate stations are remotely fed with a constant direct current in a series circuit, to provide switch auxiliaries in the intermediate stations which, given an interruption of the feed current, close the feed circuit in front of the faulty field. Thereby, a low and, therefore, harmless d.c. voltage is at the fault location. This serves for checking the following cable field and enables the automatic cancellation of the cross connection of the switch auxiliary as soon as the interruption is eliminated, i.e. as soon as a fault-free cable field to the following intermediate station has been reconnected. Given a short circuit of the feed circuit, the d.c. series feed continues to remain operational even without a switch auxiliary; in this case, a hazardous voltage likewise does not occur at the fault location.

In contrast thereto, completely different conditions exist given alternating current parallel feed. With an alternating current parallel feed, continued operation is possible given an interruption of the feed circuit without an auxiliary device; however, conductors at the fault location which can be contacted carry a high remote feed voltage of, for example, 1000 volts. In order to exclude personal hazard, the remote feed must therefore be shut off given such a fault. Therefore, the question is raised as to how a line interruption is to be perceived at the feed location. Given a constant power consumption of the intermediate stations, an interruption results in a corresponding reduction of the remote feed current depending on the position of the fault location. Given a changing power consumption in the intermediate stations, however, the fault recognition from the side of the remote feed can be problematical. Every outage report at the transmission side, even when a fault does not lie in the remote feed path, would then be employed for a shutdown of the remote feed. The question therefore arises as to how the faulty field is to be located when the remote feed must remain shut down for reasons of protection of personnel.

Considerations of the framework of the present invention has shown that it is advantageous when the voltage disconnection of the fault location does not occur in the feed location but in the intermediate station located in front of the fault location. It is advantageous for locating the fault when, given a short circuit in the remote feed circuit, only the faulty cable field is shut off instead of the entire remote feed circuit.

SUMMARY OF THE INVENTION

It is therefore the object of the present invention to provide switching apparatus which, given alternating current parallel feed, enables safe continued operation in the case of a line fault.

According to the invention, the switching apparatus contains switches for disconnecting the remote feed current paths and for connecting a direct current source to the section of the remote feed field facing away from the alternating voltage source. The switches are controllable by the direct current emitted by the direct current source and are controllable by the alternating currents flowing in the remote feed current paths, the switches being controllable in such a manner that, in the current-free condition, the remote feed current paths are interrupted and the d.c. voltage source is connected, the feed current paths are through-connected and the d.c. voltage source is disconnected from the remote feed current paths giving a direct current within a prescribed range and, given alternating currents lying outside of the prescribed range, the remote feed current paths are interrupted and the d.c. voltage source is connected. Preferably, such a switching apparatus is provided in each intermediate station.

By way of the above measures, a switch device advantageously arises which automatically avoids personal hazard in every fault occurrence and which simultaneously permits continued operation of the remote feed to the greatest possible scope in all operating instances. It is of further particular advantage that, even given users having a relatively greatly variable power consumption, positive operation of the remote feed is guaranteed, particularly given feed of intermediate stations of light waveguide communication transmission circuits having laser diodes which are cooled by Peltier elements.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
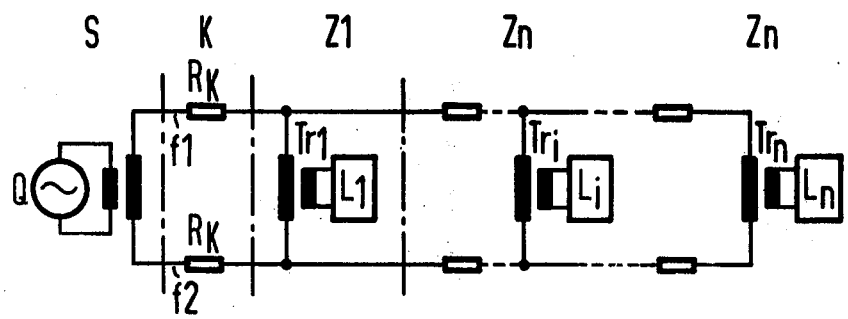
FIG. 1 is a schematic circuit diagram of a device for alternating current parallel remote feed.

Referring to FIG. 1, a device for alternating current parallel remote feed is illustrated as comprising a plurality of intermediate stations Zl, Zi, Zn for an installation of communication transmission technology, the device being fed from an alternating voltage source Q. The remote feed current paths f1, f2 are connected to the alternating current source Q via a transformer provided at the feed location S.

A respective transformer $Tr_l$, $Tr_i$, $Tr_n$ is connected to the remote feed current paths f1 and f2 at each intermediate station, the secondary winding of the transformer feeding a respective load $L_l$, $L_i$, $L_n$. The individual sections of the remote feed circuit lie between the transformers. The winding resistances of the cable are referenced $R_K$.

The device for alternating current parallel remote feed can be modified in a known manner. In particular, the continuing cable field K in the intermediate stations Zl, Zi, Zn can be connected to a step-up winding of the transformer for the purpose of compensating voltage drops instead of being respectively directly connected to the preceding cable field.

Figure 2:
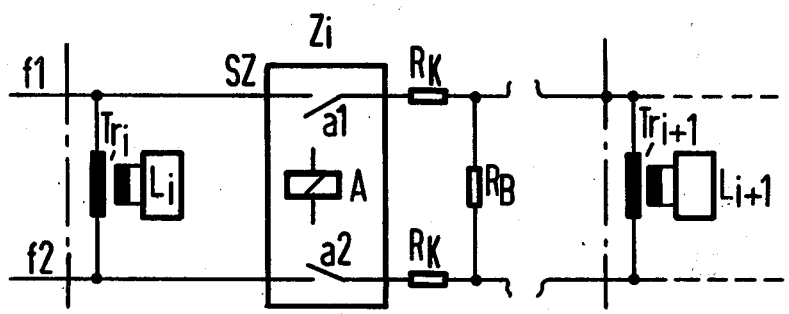
FIG. 2 is a schematic circuit diagram illustrating the insertion of switching apparatus, according to the present invention, in the device of FIG. 1.

FIG. 2 illustrates the insertion switching apparatus in an intermediate station Zi. The switching apparatus SZ contains a relay A whose contacts a1, a2 are respectively inserted in the remote feed current paths f1 and f2. The following cable field is to be disconnected in case of fault with the assistance of the relay A.

The switching apparatus SZ should exhibit the following properties:

1. Given a short circuit or interruption on the line the faulty cable field is disconnected; and
2. Given a fault-free line, the following cable field is checked. Connection of the cable occurs only when the following field is not interrupted and when it exhibits no input resistance which could be a contact resistance between exposed conductors, for example, R=2 kΩ. With this requirement, however, a difficulty occurs in that a check of the alternating current resistance of the following field can also produce approximately the same value in the faulty condition which corresponds to a contact resistance RB, for example, remote feed voltage 1000 volts, and a load of 500 watts.

Figure 3:
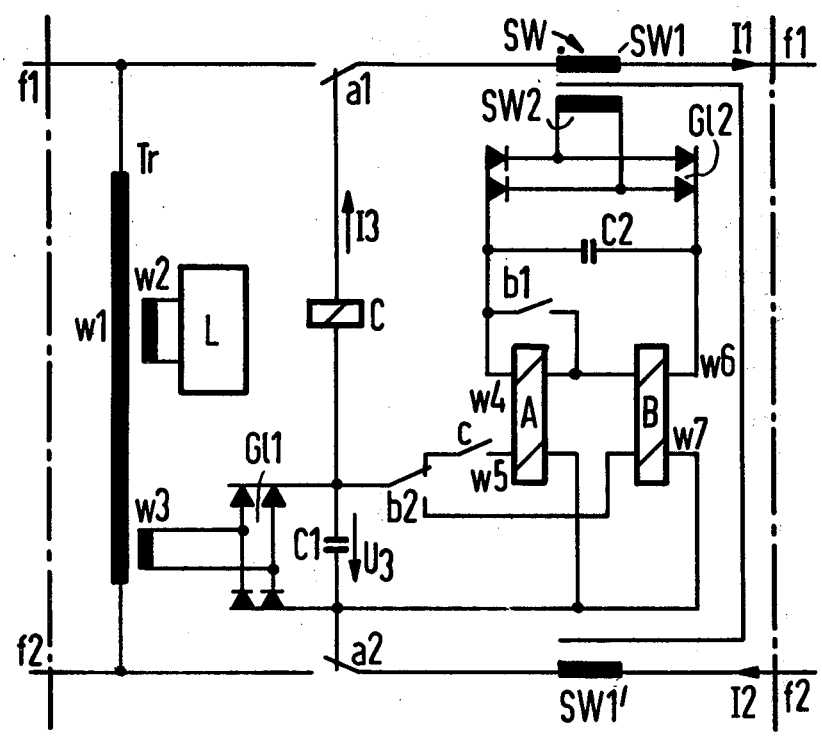
FIG. 3 is a schematic circuit diagram of a switching apparatus constructed in accordance with the invention.

FIG. 3 illustrates an exemplary embodiment of switching apparatus for intermediate stations fed with alternating current which exhibits all of the above properties and which is constructed in accordance with the present invention.

The check of the following field as to an operational condition can be executed without hazard to personnel despite the mentioned difficulties in that the same is carried out with a low d.c. voltage, since then it is only the winding resistances of the cable and of the next-following transformer which are effective, their sum value in the magnitude of, for example, 100 Ω clearly lying below the contact resistance of, for example, 2 kΩ.

Given the switching apparatus illustrating FIG. 3, the primary winding w1 of a transformer Tr is electrically connected to the incoming remote feed current paths f1, f2. The load L is connected to a secondary winding w2. A rectifier circuit G11 has a capacitor C1 connected there-across and is connected to a further winding w3. A d.c. voltage U3 is available across the capacitor C1 and amounts to, for example, 40 volts.

A relay C is connected in series with the capacitor C1. The switching apparatus SZ of the intermediate station Zi further contains a relay A and a relay B. The relay A has two transfer contacts a1 and a2 whose movable contacts are connected to the continuing side of the remote feed current paths. The transfer contact a1 and a2 selectively apply the continuing sides of the remote feed current paths f1 and f2 to the incoming sides of the remote feed current paths f1 and f2, on the one hand, and to the series connection of the relay C and the capacitor C1, on the other hand.

A respective primary winding SW1 or SW1' of a current transformer SW is connected in the continuing remote feed current paths f1 and f2. Thereby, the winding direction is selected in such a manner that the magnetic fluxes are additive.

A rectifier circuit G12 is connected to the secondary winding SW2 of the current transformer SW. A capacitor C2 is connected across the rectifier circuit G12. A series connection comprising a first winding w4 of the relay A and the first winding w6 of the relay B is connected to the capacitor C2. A transfer contact b2 of the relay B selectively, applies the capacitor C1 to the secondary winding w5 of the relay A or to a second winding w7 of the relay B. Moreover, the make contact c of the relay C is connected in series to the second winding w5 of the relay A and a make contact b1 of the relay B is connected in parallel with the first winding w4 of the relay A.

The relay A, which is preferably a high-voltage contactor, serves for the connection or disconnection of the following field. In the quiescent condition the following field is disconnected from the feed voltage and is connected to a d.c. voltage source having, for example, 40 volts. A relay C connected in series with the d.c. voltage source checks whether the direct current resistance of the following field exhibits a reference value. Given a fault-free field, the relay C is energized by the check current I=U/ΣR and, by way of a contact c, produces a response of the relay A via its second winding w5. Given the remote feed current I1, I2 switched on in such a manner, and with the values of the currents I1 and I2 being equal given undisrupted operation, holding is provided over the test current transformer SW with the winding w4. The transfer contacts a1, a2 simultaneously, bipolarly disconnect the d.c. voltage serving as the check voltage from the remote feed current paths f1, f2.

Given a remote feed device having a plurality of remotely-fed intermediate stations, the starting procedure sequences in this manner along the entire line when placing the remote feed in operation.

In case of an interruption of the following field, only capacitive currents are then still flowing, i.e. the remote feed current becomes very small or becomes zero as a result of which the relay A drops out and its transfer contacts a1, a2 disconnect the faulty field from the remote field voltage and apply the same to the test d.c. voltage.

In case of a short circuit in the following field, the remote field current clearly rises above its nominal value. This causes a response of the excess current relay B. Via the contact b1, this causes the drop out of the main relay A so that a line disconnection is produced. Over the transfer contact b2, the relay B holds itself at the d.c. voltage or, respectively, auxiliary voltage over the winding w7, whereby the auxiliary voltage for the winding w5 of the relay A is simultaneously shut off. Therefore, a connection to the short circuit does not follow, although the relay C also responds to a short circuit.

In this case, after elimination of the short circuit, the blockage of the relay B is released after disconnection and reconnection of the remote feed voltage in the feed location S.

Monitoring the remote feed circuit in this form is intrinsically safe in an advantageous manner, i.e. for every fault, the winding of the relay A produces an immediate disconnection of the following feed section. An outage of the auxiliary voltage makes every and all starting procedures possible. Therefore, personal hazard due to a fault in the switching apparatus is likewise impossible.

The relays employed in the exemplary embodiment according to FIG. 3, particularly the relays B and C as well as the drive of the relay A, can be advantageously replaced by corresponding electronic circuits, preferably by electronic threshold switches. Thereby, the self-holding can be advantageously-realized with the assistance of a flip-flop.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Switching apparatus for connection in an intermediate station between an alternating voltage source and a following station in an alternating current parallel feed from the source to the stations, the feed having a pair of feed conductors, said switching apparatus comprising:
   a d.c. voltage source for producing a d.c. voltage;
   switch means including a pair of transfer switches each interposed in a respective one of the feed conductors; and
   control means connected to said feed conductors and to said switch means and operable in response to a current-free condition on the feed conductors to control said switch means to connect said d.c. voltage source to the following station via said transfer switches and the feed conductors, operable in response to a direct current, due to the connected d.c. voltage source, within a predetermined range to through-connect the feed conductors to the following station via said transfer switches, and operable in response to alternating current outside of a predetermined range to control said switch means to connect said d.c. voltage source to the following station via said transfer switches and the feed line.

2. The switching apparatus of claim 1, wherein said control means comprises:
   a current transformer connected in the feed conductors on the following station side of said transfer switches; and
   at least one threshold relay connected between said current transformer and said transfer switches.

3. The switching apparatus of claim 1, wherein said control means comprises:
   means connected to the feed conductors and to said transfer switches and operable to control the operation of said transfer switches in response to alternating current above and below respective thresholds.

4. The switching apparatus of claim 1, wherein said control means comprises:
   a current transformer connected in the feed conductors on the following station side of said transfer switches; and
   a pair of relays connected to said current transformer and operable to detect current outside of a predetermined range,
   said transfer switches comprising relay contacts for and operated by one of said relays.

5. The switching apparatus of claim 4, wherein:
   said one relay comprises a first winding and a second winding, and further comprising
   current deriving means connected between said transformer and said second winding for providing a test current thereto as derived from the alternating feed current; and
   a d.c. threshold switch connected between said d.c. voltage source and the feed conductors and operable in response to a complete d.c. circuit through the feed conductors and the following station to connect said first winding to said d.c. voltage source.

6. The switching apparatus of claim 5, wherein:
   the other of said relays comprises first and second windings and a set of contacts,
   said first winding connected to said current deriving means to receive the test current, and
   said second winding connectible to said d.c. voltage source via said set of contacts.

7. The switching apparatus of claim 6, wherein:
   said d.c. threshold switch comprises a relay including a set of make contacts connected between said second winding of said one relay and said d.c. voltage source; and
   said set of contacts of said other relay comprises transfer contacts including a movable contact connected to said d.c. voltage source, a first fixed contact connected to said set of make contacts and a second movable contact connected to said second winding of said other relay.

8. The switching apparatus of claim 1, wherein said d.c. voltage source comprises an auxiliary voltage source connected to and driven by the alternating current on the feed conductors.

9. The switching apparatus of claim 8, wherein said d.c. voltage source comprises:
   a transformer including a primary winding connected across the feed conductors, and a secondary winding;
   a rectifier connected to said secondary winding; and
   a capacitor connected to said rectifier.

10. A power distribution system comprising:
   an alternating voltage source;
   a plurality of load stations;
   an alternating current parallel feed connected to said source and to each of said load stations; and
   a plurality of switching apparatus each for connection in a respective load station between an alternating voltage source and a following station in said alternating current parallel feed from the source to the stations, each of said switching apparatus comprising
   a d.c voltage source for producing a d.c. voltage;
   switch means including a pair of transfer switches each interposed in a respective one of the feed conductors; and
   control means connected to said feed conductors and to said switch means and operable in response to a current-free condition on the feed conductors to control said switch means to connect said d.c. voltage source to the following station via said transfer switches and the feed conductors, operable in response to a direct current, due to the connected d.c. voltage source, within a predetermined range to through-connect the feed conductors to the following station via said transfer switches, and operable in response to alternating current outside of a predetermined range to control said switch means to connect said d.c. voltage source to the following station via said transfer switches and the feed line.

* * * * *